United States Patent
Scott et al.

(10) Patent No.: US 10,011,194 B1
(45) Date of Patent: Jul. 3, 2018

(54) SYSTEM AND METHOD FOR POSITIONING A VEHICLE SEAT

(71) Applicant: LEAR CORPORATION, Southfield, MI (US)

(72) Inventors: Ray Scott, Troy, MI (US); David Kazyak, Brighton, MI (US); Karl Henn, New Hudson, MI (US); Jasmine Pizana, Scottville, MI (US); Mladen Humer, West Bloomfield, MI (US); Arjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/453,304

(22) Filed: Mar. 8, 2017

(51) Int. Cl.
- *G06F 7/00* (2006.01)
- *B60N 2/06* (2006.01)
- *B60N 2/42* (2006.01)
- *B60R 22/48* (2006.01)
- *B60N 2/01* (2006.01)

(52) U.S. Cl.
CPC ............. *B60N 2/06* (2013.01); *B60N 2/01* (2013.01); *B60N 2/4228* (2013.01); *B60R 22/48* (2013.01)

(58) Field of Classification Search
USPC .......................................................... 701/36
See application file for complete search history.

(56) References Cited

U.S. PATENT DOCUMENTS

| 8,630,772 | B2 | 1/2014 | Ieda et al. |
| 9,266,487 | B2 | 2/2016 | Engelman et al. |
| 2002/0092693 | A1* | 7/2002 | Breed .............. B60N 2/002 180/282 |
| 2004/0129478 | A1* | 7/2004 | Breed .............. B60N 2/002 180/273 |
| 2008/0162002 | A1* | 7/2008 | Bacher ............ B60N 2/0232 701/45 |
| 2008/0189053 | A1* | 8/2008 | Breed .............. G01S 7/417 702/41 |
| 2010/0280718 | A1* | 11/2010 | Hashimoto ...... B60N 2/0276 701/45 |
| 2016/0176322 | A1* | 6/2016 | Frommann ..... B60N 2/42709 701/45 |

FOREIGN PATENT DOCUMENTS

| DE | 10 2011 122384 A1 | 9/2012 |
| DE | 10 2011 102088 A1 | 11/2012 |

* cited by examiner

*Primary Examiner* — Tyler D Paige
(74) *Attorney, Agent, or Firm* — Brooks Kushman P.C.

(57) ABSTRACT

A system and method for positioning a seat arrangement in a vehicle having a front seat arrangement and a rear seat arrangement includes moving the rear seat arrangement rearward relative to the vehicle when a plurality of criteria are met, including at least one criterion related to occupancy of the rear seat arrangement and at least one criterion related to a likelihood of impact into the vehicle from behind the vehicle. The rear seat arrangement is not moved rearward when at least one of the criteria is not met.

20 Claims, 4 Drawing Sheets

US 10,011,194 B1

SYSTEM AND METHOD FOR POSITIONING A VEHICLE SEAT

TECHNICAL FIELD

The present disclosure relates to a system and method for positioning a vehicle seat.

BACKGROUND

A number of systems and methods exist for adjusting or otherwise moving a seat in a vehicle into a desired position based on the occurrence of one or more events, such as an impact by another vehicle. Examples of such systems and methods may be found in one or more of the following references: DE102011102088A1, DE102011122384A1, and U.S. Pat. No. 9,266,487B2.

SUMMARY

At least some embodiments described herein may include a method for positioning one or more seat arrangements in a vehicle having a front seat arrangement and a rear seat arrangement. The method includes increasing a separation distance between the front seat arrangement and the rear seat arrangement when the rear seat arrangement is occupied and at least one criterion indicates a likelihood of an impact into the vehicle from behind the vehicle, and wherein increasing the separation distance includes moving the rear seat arrangement rearward relative to the vehicle.

At least some embodiments described herein may include a method for positioning one or more seat arrangements in a vehicle having a front seat arrangement and a rear seat arrangement. The method includes moving the rear seat arrangement rearward relative to the vehicle when a plurality of criteria are met. The criteria include at least one criterion related to occupancy of the rear seat arrangement and at least one criterion related to a likelihood of impact into the vehicle from behind the vehicle. The method further includes not moving the rear seat arrangement rearward relative to the vehicle when at least one of the criteria is not met.

At least some embodiments described herein may include a system for positioning one or more seat arrangements in a vehicle having a front seat arrangement and a rear seat arrangement. The system may include a control system including at least one controller and configured to control a relative position of the front seat arrangement to the rear seat arrangement based on a plurality of inputs. Control of the relative position of the front seat arrangement to the rear seat arrangement includes moving the rear seat arrangement rearward relative to the vehicle based on at least one input indicative of the occupancy of the rear seat arrangement and at least one input indicative of a likelihood of an impact into the vehicle from behind the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
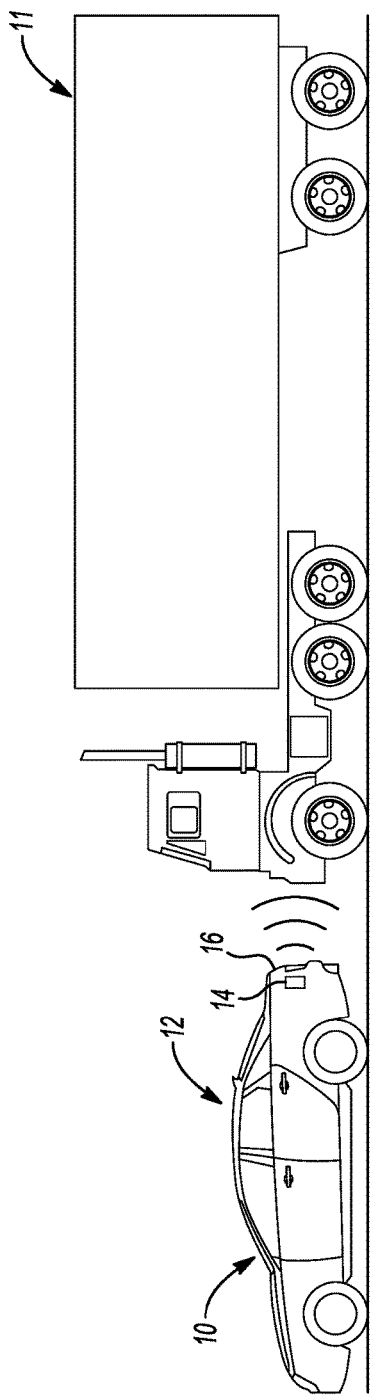
FIG. 1 shows a target vehicle having a system for positioning a seat arrangement in accordance with embodiments described herein, and an approaching vehicle approaching the target vehicle from the rear.

FIG. 1 shows a target vehicle 10 and an approaching vehicle 11, which is approaching the vehicle 10 from the rear. Depending on the relative speeds of the vehicles 10, 11, the vehicle 11 may impact the vehicle 10 from the rear. The vehicle 10 includes a system 12 for positioning one or more seat arrangements in accordance with embodiments described herein. The system 12 may include a number of components working together to analyze information and to take specific actions. For example, in the embodiment shown in FIG. 1, the system 12 includes a sensor arrangement 14 disposed toward a rear 16 of the vehicle 10. The sensor arrangement 14 may include one or more sensor systems such as radar, laser distance measuring systems such as LIDAR, cameras, or other sensor systems that provide information related to conditions around the vehicle 10, such as behind it or on the sides.

Figure 2:
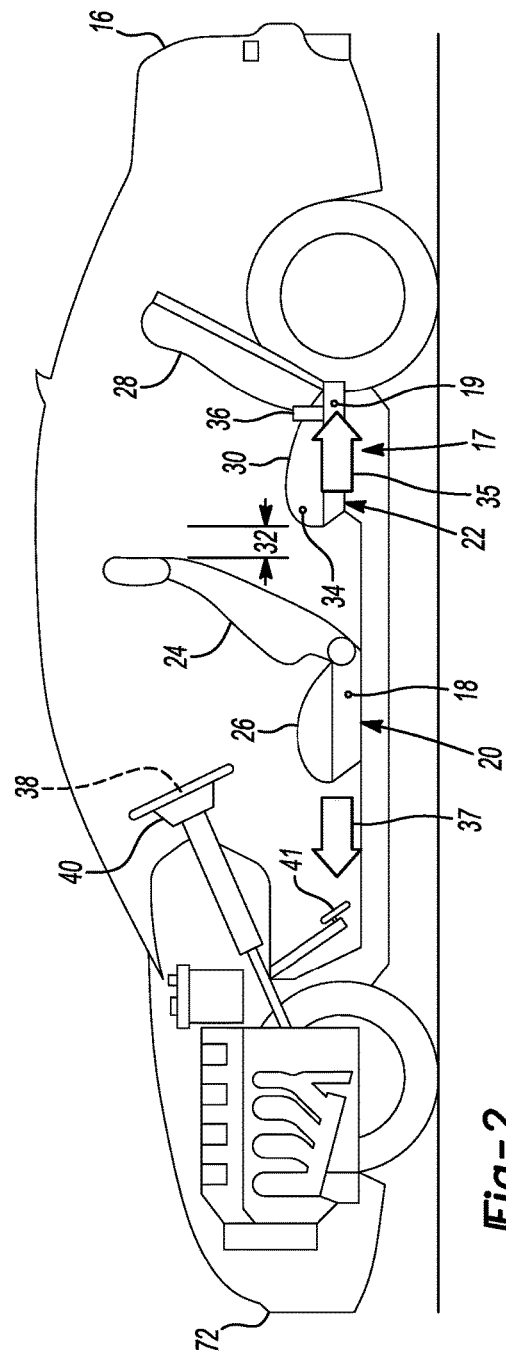
FIG. 2 shows the target vehicle in detail.

The vehicle 10 is shown in more detail in FIG. 2, where it is illustrated that the system 12 includes a control system 17 having controllers 18, 19 embedded within respective front and rear seat arrangements, which in this embodiment include a front seat 20, and a rear seat 22. The controllers 18, 19 may have one or more processors, memory, and supporting circuitry to receive inputs and send output signals in accordance with embodiments described herein. The controllers 18, 19 may be memory modules of the kind used to retain seat position preferences for the occupants, or may be dedicated controllers. In the embodiment illustrated in FIGS. 1 and 2, signals from the sensor arrangement 14 are communicated with the control system 17, and more particularly the controllers 18, 19, and either or both of the sensor arrangement 14 and the controllers 18, 19 may communicate with other controllers or control systems within the vehicle 10, such as vehicle system controllers, through a communications network—e.g., a controller area network. In addition to the sensor arrangement 14, other sensors and sensor systems of the system 12 may work alone or in conjunction with the sensor arrangement 14 and the controllers 18, 19. Rather than having separate controllers 18, 19 associated with the front and rear seats 20, 22, embodiments described herein may also have a control system with a single, central controller configured to control operation of both of the seats 20, 22.

As shown in FIG. 1, there is an object, or more particularly a vehicle 11, approaching the vehicle 10 from behind. Based on inputs from the sensor arrangement 14, the control system 17, alone or in conjunction with a larger control system, may determine that the approaching vehicle 11 has reached an impact zone. The actual distance to the rear 16 of the vehicle 10 may vary for an impact zone depending on a number of factors, including the speed of the approaching vehicle 11 relative to the speed of the vehicle 10, whether either or both of the vehicles 10, 11 are accelerating, and generally whether the distance between the vehicle 10 and the vehicle 11 is increasing or decreasing. In at least some embodiments, an impact zone may be defined based on a "time-to-impact" and may be, for example, approximately 1200 milliseconds (ms). Embodiments described herein contemplate certain actions being taken when an approaching vehicle is within an impact zone, and in some cases multiple impact zones may be defined wherein different actions are taken depending on which impact zone the approaching vehicle has entered. A description of multiple impact zones and different actions that may be taken can be found, for example, in U.S. patent application Ser. No. 15/383,361, entitled: System and Method for Positioning a Vehicle Seat, filed on Dec. 19, 2016, which is incorporated by reference herein.

The control system 17 may take certain actions based on a number of inputs, including inputs from the sensor arrangement 14. Other inputs may include, for example, inputs from sensors embedded within the front seat 20 or another seat arrangement, such as a rear seat 22. The seat sensors may indicate whether the respective seat 20, 22 is occupied, what its position is, or both. With regard to position, the seat sensors may indicate a longitudinal position of the entire seat, such as the front seat 20 or the rear seat 22, or they may indicate an angular position of a seat back relative to a seat cushion—see, e.g., the seat back 24 and the seat cushion 26 of the front seat 20, and the seat back 28 and seat cushion 30 of the rear seat 22. In addition to or instead of receiving inputs from sensors embedded within the seats 20, 22, the control system 17 may receive inputs from lasers, cameras, or other sensor systems that provide information regarding whether one or both of the seats 20, 22 is occupied. As used herein, a seat may be "occupied" by a person sitting on the seat cushion; it may be occupied by an infant in a child carrier seat, a child sitting in a booster seat, or even by an object or objects occupying space relative to the seat cushion and seat back. In at least some embodiments, the system may proceed on an assumption that a seat such as the rear seat 22 is occupied.

In the embodiment shown in FIGS. 1 and 2, the rear seat 22 is directly behind the front seat 20, and information regarding the occupancy of one or both of the seats 20, 22 may be used as part of a system and method of seat positioning in accordance with embodiments described herein. The term "directly behind" as used in relation to forward and rearward seats described herein is not limited to a rearward seat that is perfectly centered on the seat in front of it. Rather, the term also describes seats that may be somewhat offset from each other, such as in the case of a rearward center seat whose occupant may be partially exposed to rearward movement of a driver-side or passenger-side seat positioned in the row in front of it.

During a rear impact it may be unfavorable to have a forward seat, such as the front seat 20, positioned close to the seat directly behind it, such as the rear seat 22; therefore, embodiments described herein provide a system and method for positioning one or more seat arrangements to a more favorable position. For example, a separation distance 32—see FIG. 2—between the front seat 20 and the rear seat 22 may be determined to be undesirably close when it is determined that an approaching vehicle, such as the vehicle 11, is within an impact zone. Although a first-row seat 20 and a second-row seat 22 are used in this example, embodiments described herein contemplate the use of systems and methods for any two seats disposed forward and rearward of each other—e.g., a second-row seat being a forward seat relative to a third-row seat, and so on. In the embodiments illustrated in FIGS. 1 and 2, the system 12, and in particular the control system 17, is configured to control the position of one or both of the front seat 20 and the rear seat 22 in response to a number of inputs. These inputs provide a number of criteria that are used to make decisions on how a method implemented by the control system 17 proceeds.

As shown in FIG. 1, the approaching vehicle 11 is determined to be within an impact zone. This is an example of a criterion that indicates a likelihood of a rear impact of the approaching vehicle 11 into the vehicle 10. In the embodiment shown in FIG. 1, this single criterion is not enough for the control system 17 to reposition either the front seat 20 or the rear seat 22. In this embodiment, another input is provided to the control system 17 from a seat sensor 34 embedded in the rear seat 22. When the information received by the control system 17 indicates that the approaching vehicle 11 is within an impact zone, and that the rear seat 22 is occupied, two criteria are met, and the control system 17 proceeds to reposition the at least the rear seat 22. In some embodiments, this repositioning may include moving the rear seat 22 longitudinally rearward relative to the vehicle 10 as indicated by the direction arrow 35 shown in FIG. 2. As described above, some embodiments may include a control system that is programmed to assume that the rear seat is occupied, so that this determination is automatic and this criterion is always met.

In the embodiment described in conjunction with FIGS. 1 and 2, both of the aforementioned criteria must be met before the rear seat 22 is moved rearward to increase the separation distance 32 between it and the front seat 20. If either of these two criteria is not met, then the rear seat 22 is not moved rearward, even if the other criterion is met. In some embodiments, the rearward movement of the rear seat 22 may be the extent of the repositioning performed when a control system executes a preprogrammed method. In this embodiment, however, additional steps may be taken. For example, certain mechanical features of the rear seat 22 may be adjusted, such as bladders, lumbar supports, or other support structures to ensure that the rear seat 22 and its support structures are all in desired positions. More specifically, a seat belt 36 of the rear seat 22 may be automatically tightened to help ensure that the seated occupant is secure in the rear seat 22 as it moves rapidly rearward.

In addition to moving the rear seat 22 rearward when the criteria are met, embodiments described herein also contemplate moving the front seat 20 forward relative to the vehicle 10 to further increase the separation distance 32. Moving the front seat 20 forward may include moving the seat back 24 and seat cushion 26 together longitudinally as indicated by the direction arrow 37, or it may include moving the seat back 24 only by pivoting it relative to the seat cushion 26; in some embodiments, it may include both longitudinal and pivoting movements. If, within a predetermined amount of time, it is determined that the approaching vehicle 11 has deviated in some way from its calculated impact with the vehicle 10, the front seat 20 may not be moved forward and the rear seat 22 may not be moved rearward as described above. Conversely, if one or both of the front seat 20 and the rear seat 22 have already been moved in such a way to increase the separation distance 32, the control system 17 may return them to their original positions after the determination that the approaching vehicle 11 is no longer going to impact the vehicle 10.

When a seat back, such as the seat back 24 is pivoted forward, it is not necessary for the entire seat back 24 to be pivoted. Rather, pivoting a seat back forward as described herein may include pivoting only a portion of the seat back forward—e.g., a thoracic and head restraint portion only may be pivoted, while a lumbar portion remains stationary. As shown in FIGS. 1 and 2, the forward direction of the seats 20, 22 coincides with the forward direction of the vehicle 10; however, embodiments described herein contemplate arrangements where a seat does not face a front of the vehicle—see, e.g., the description below in conjunction with FIGS. 4B and 4C, and FIG. 5.

In the embodiment shown in FIG. 2, the front seat 20 is moved forward by a predetermined amount, which may be based at least in part on a physique of the occupant of the front seat 20, a current position of the front seat 20—especially in relation to an airbag 38 disposed in a steering wheel column 40—or both. Taking these criteria into account, the front seat 20 may be moved forward by a predetermined amount that is less in some situations and greater in other situations. For example, the predetermined amount of forward movement for the front seat 20 may be reduced if the occupant of the front seat 20 is particularly large, or if the front seat 20 is positioned very close to the airbag 38—or in the case of a passenger-side seat, very close to the dashboard. Similarly, if the separation distance 32 is already substantial, the amount of movement of the front seat 20 forward, and the rear seat 22 rearward, may be relatively small. In at least some embodiments, an accelerator pedal 41 is disengaged when the front seat back 20 is moved forward. The control system 17 may communicate with a vehicle system controller or other controller to effect the disengagement.

Figure 3:
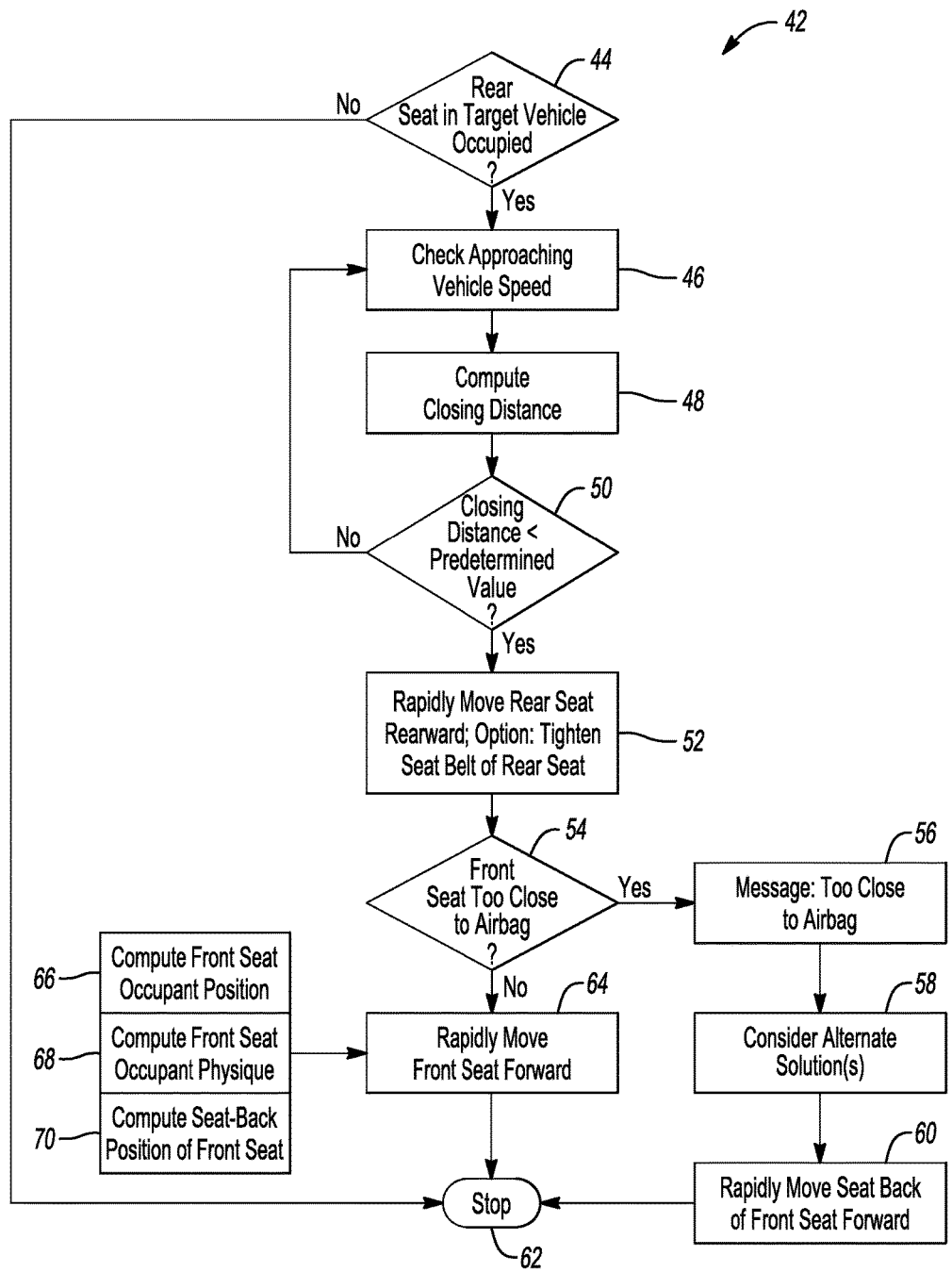
FIG. 3 shows a flowchart illustrating a method in accordance with embodiments described herein.

FIG. 3 shows a flowchart 42 illustrating the steps of a method in accordance with embodiments described herein. The steps of the method may be automatically executed, for example, by a control system such as the control system 17, although at least some embodiments may include a manual override to selectively turn ON and OFF the automatic execution of the steps illustrated in the flowchart 42. For convenience in describing the steps shown in the flowchart 42, the elements illustrated and described in FIGS. 1 and 2 will be used for reference. At step 44, it is determined whether the rear seat 22 is occupied. As described above this information may come from a sensor, such as the seat sensor 34, or other types of sensors; in some embodiments, occupancy of the rear seat may be assumed so that the determination is automatic. If the rear seat 22 is occupied, the method moves to step 46 where the speed of the approaching vehicle 11 is monitored. Based on this speed and the speed of the target vehicle 10, a closing distance is computed at step 48. At decision block 50 it is determined whether the closing distance is less than some predetermined value. Although the flowchart 42 describes the likelihood of impact in terms of a closing distance relative to a predetermined value, these parameters may also be considered in view of a time-to-impact as described above.

If the determination is made at step 50 that the closing distance is not less than the predetermined value—in other words, it has been determined that there is not a reasonable likelihood of impact—the method returns to step 46 and the speed of the approaching vehicle 11 is again monitored. Steps 46-50 are repeated until such time that it is determined that there is a likelihood of impact—i.e., the closing distance is less than the predetermined value. Then the method moves to step 52 where the rear seat 22 is rapidly moved rearward relative to the vehicle 10. Optionally, the seat belt 36 may be tightened, and other ancillary features of the rear seat may be adjusted as described above.

Next there is a determination as to whether the front seat 20 should also be moved forward to increase the separation distance 32. At decision block 54, it is determined whether the front seat 20 is too close to the airbag 38. If it is, the control system 17 may cause a message to be provided to warn the occupant that the front seat 20 is too close to the airbag 38—see step 56. At step 58, alternate solutions may be considered—for example, the predetermined amount by which the front seat 20 will be moved forward may be reduced because of its proximity to the airbag 38. At step 60, the seat back 24 of the front seat 20 is rapidly moved forward by a predetermined amount, which may be based in part on the proximity of the front seat 20 to the airbag 38. At step 62, the routine ends, which is what occurs after the beginning step 44 if it is determined that the rear seat 22 is not occupied.

Returning to decision block 54, if it is determined that the front seat 20 is not too close to the airbag 38, the method moves to step 64, where the front seat 20 is rapidly moved forward. As shown in the flowchart 42, a number of inputs may be provided to step 64 to help the control system 17 properly move the front seat 20 forward. For example, an input 66 provides information about the position of the occupant of the front seat 20. An input 68 provides information about the physique of the occupant of the front seat 20, and an input 70 provides information regarding the position of the seat back 24 of the front seat 20. A control system, such as the control system 17 may be preprogrammed with decision hierarchy, lookup tables, or other data and algorithms that provide information upon which step 64 is based. Thus, movement of the front seat 20 forward may be based on any number of criteria considered relevant to properly position it as the separation distance 32 is controlled.

Figure 4A:
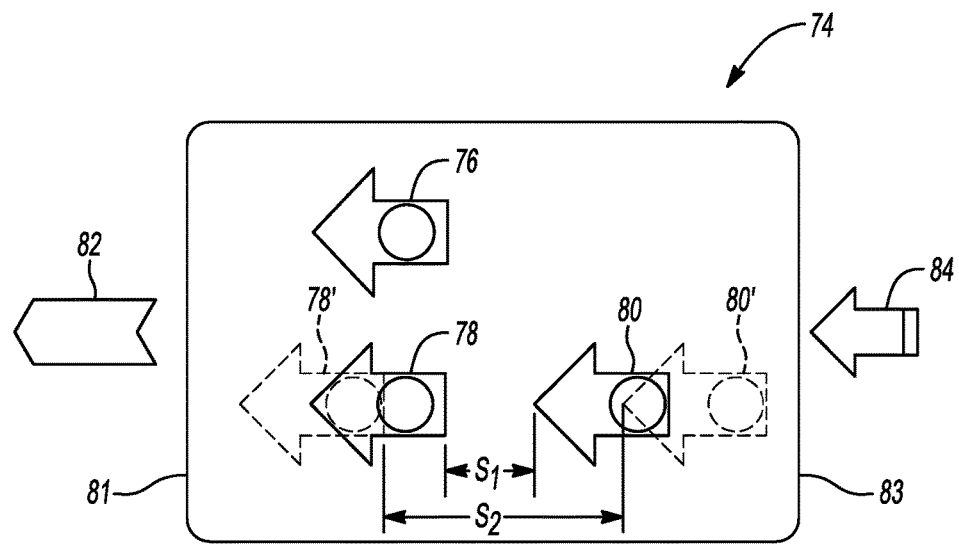
FIGS. 4A-4C show schematic representations of a vehicle with seats having different orientations being controlled in accordance with embodiments described herein.

The embodiment shown in FIGS. 1 and 2 illustrates a situation in which both of the seats 20, 22 are in a standard orientation relative to the vehicle 10—i.e., both of the seats 20, 22 are facing forward toward a front 72 of the vehicle 10. In this situation, moving a seat forward or rearward relative to the vehicle is the same as moving the seat forward or rearward relative to the seat itself. This is the same orientation shown in FIG. 4A. Shown schematically in FIG. 4A is a vehicle 74 that includes a front passenger-side seat 76, a front driver-side seat 78, and a rear driver-side seat 80. The positions and orientations of the seats 76, 78, 80 are indicated by the solid circles and arrows. In this illustration, each of the seats 76, 78, 80 faces a front 81 of the vehicle 74, which is moving in a forward direction as indicated by the direction arrow 82. This is the orientation described above with regard to FIGS. 1 and 2, and embodiments of systems and methods described above may be implemented in the event of an impact into a rear 83 of the vehicle 74—see the direction arrow 84.

Figure 4B:
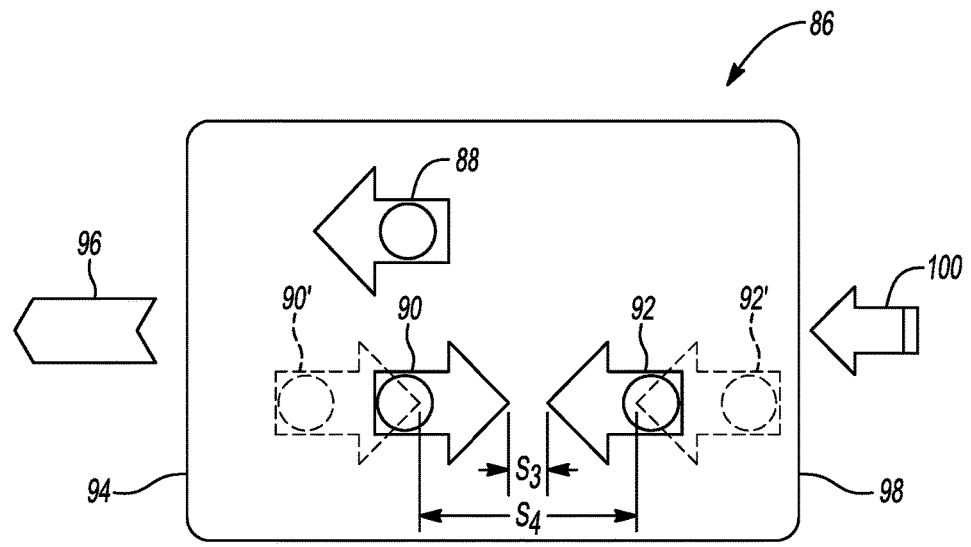

As shown in FIG. 4A, systems and methods described herein act to move the rear seat 80 rearward and the front seat 78 forward, each relative to the vehicle 10 and to the seats 78, 80 themselves, to increase a separation distance between them. The new position of the seats is indicated by the arrows and circles with dashed lines, which are labeled using the prime (') symbol. As shown in FIG. 4A, the initial separation distance between the front seat 78 and the rear seat 80 is indicated by ($S_1$). After implementation of a system and method for positioning the seats as described herein, the separation distance is larger as indicated by ($S_2$). It should be noted that the relative increase in separation distance indicated in the schematic drawings of FIGS. 4A-4C is exaggerated for purposes of the illustration.

Embodiments described herein may also be used with vehicles employing non-standard seat orientations, such as may be found in autonomous vehicles, or even chauffeur-driven vehicles where an occupant may be able to adjust the seat orientation to a non-forward-facing aspect. FIGS. 4B and 4C, and FIG. 5, illustrate applications of systems and methods described herein to a vehicle having at least one seat with a non-standard orientation. In these situations, the terms "forward" and "rearward" may be different depending on whether the point of reference is the vehicle or the seat. FIG. 4B shows a vehicle 86 that includes a front passenger-side seat 88, a front driver-side seat 90, and a rear driver-side seat 92. As shown in FIG. 4B, the seat 88 and the seat 92 are both facing a front 94 of the vehicle 86, which is traveling a forward direction, as indicated by the direction arrow 96. In contrast, the front driver-side seat 90 is oriented 180° from its standard orientation so that it faces a rear 98 of the vehicle 86. In the event of an impact into a rear 98 of the vehicle 86—as indicated by the direction arrow 100—systems and methods of embodiments described herein may be implemented to move the rear seat 92 rearward and the front seat 90 on the driver's side forward, each relative to the vehicle 86, even though the seat 90 is facing the rear 98 of the vehicle 86. Here the goal is the same as in the other configuration—i.e., to increase the separation distance between the seats 90, 92. As shown in FIG. 4B, this is achieved as the separation distance is initially ($S_3$) and is increased to ($S_4$) after the seats 90, 92 have been repositioned.

Figure 4C:
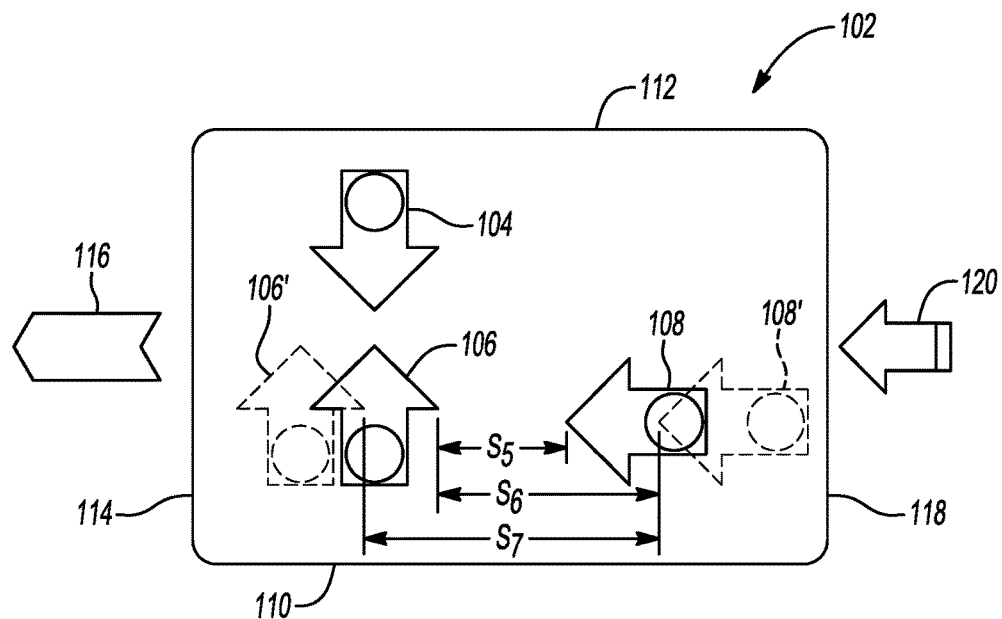
Figure 5:
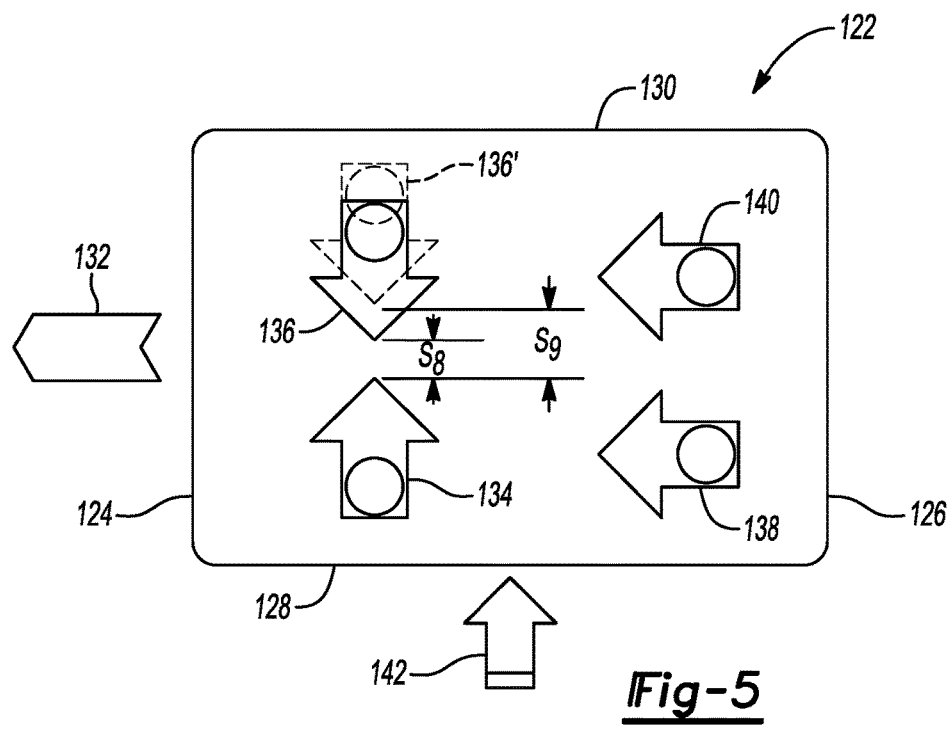
FIG. 5 shows a schematic representation of a vehicle with seats being controlled in accordance with embodiments described herein, wherein there is a likelihood of impact to the vehicle from the side.

FIG. 4C shows a vehicle 102 that includes a front passenger-side seat 104, a front driver-side seat 106, and a rear driver-side seat 108. As shown in FIG. 4C, the seat 104 and the seat 106 are facing each other, and are oriented toward respective sides 110, 112 of the vehicle 102. In contrast, the seat 108 is facing a front 114 of the vehicle 102, which is traveling in a forward direction as indicated by the direction arrow 116. In the event of an impact into a rear 118 of the vehicle 102—as indicated by the direction arrow 120—systems and methods of embodiments described herein may be implemented to move the rear seat 108 rearward relative to the vehicle to increase the separation distance from ($S_5$) to ($S_6$). Because the front driver-side seat 106 is oriented toward a side 112 of the vehicle 102, embodiments described herein may inhibit its movement toward a front 114 of the vehicle 102. Alternatively, the seat 106 may be moved forward—see 106'.

In this situation, the front seat 106 is moved forward relative to the vehicle 102, but is moved laterally relative to the seat 106 itself. In general, it is moved in a direction to increase the separation distance between itself and the seat 108. As shown in FIG. 4C, even without moving the front seat 106 forward, the separation distance between the seats 106, 108 is increased from ($S_5$) to ($S_6$), but by moving both seats 106, 108 away from each other, the separation distance is increased even further to ($S_7$). Although they were not illustrated in FIGS. 4A-4C, it is understood that rear passenger-side seats may be controlled similarly to the rear driver-side seats 80, 92, 108 as described above, and they may be controlled together with the corresponding front passenger-side seats 76, 88, 104.

FIGS. 4A-4C show a number of different seat orientations and how embodiments described herein may be implemented to them. Systems and methods of increasing a separation distance between front and rear seat arrangements as described herein may also be applied when a rear seat is facing a direction other than the front of the vehicle. For example, any of the examples provided in FIGS. 4A-4C may be implemented when a rear seat—such as any of the rear seats 80, 92, 108—is facing a rear passenger-side seat, or more generally, the passenger's side of the vehicle. Similar to the movement of the seat 106 illustrated in FIG. 4C, a rear seat facing at an angle relative to the front of the vehicle may be moved rearward relative to the vehicle as part of a system and method for separating a distance between the front and rear seats. This may be dependent, however, on the swivel mechanism for the rear seat being configured to allow such movement, for example, when the swivel mechanism is positioned so that the seat tracks would remain positioned with a front-to-rear orientation relative to the vehicle.

In addition to increasing a separation distance between front and rear seats, at least some embodiments described herein may also increase a separation distance between seats disposed on opposite sides of a vehicle in the same row when a side-impact occurs. FIG. 5 shows a vehicle 122 with a front 124, a rear 126, a first side 128, and a second side 130. The vehicle is moving forward as indicated by the direction arrow 132, and the first side 128 is a driver's side, while the second side 130 is a passenger's side. The vehicle 122 includes a first seat arrangement, which in this embodiment is a front driver-side seat 134, and a second seat arrangement, which in this embodiment is a front passenger-side seat 136. Both of the seats 134, 136 are in the first row of the vehicle 122, although they could be in a second or third row, for example. In the embodiment shown in FIG. 5, the vehicle 122 also includes a rear driver-side seat 138 and a rear passenger-side seat 140, which are both in the second row.

As shown in FIG. 5, there is a likelihood of impact into the vehicle 122 from the first side, or driver's side, as indicated by the direction arrow 142. In a situation where both the seat 134 and the seat 136 are occupied, and at least one criterion indicates a likelihood of impact from a side of the vehicle—in this case the driver's side—systems and methods described herein may act to increase a separation distance between the seat 134 and the seat 136. As described above, a sensor arrangement, such as the sensor arrangement 14 shown in FIG. 1, may be configured to detect certain conditions around the vehicle 122, including the front, rear or sides of the vehicle. Thus, such a sensor arrangement may communicate with a control system on the vehicle 122 similar to the control systems described above to indicate a likelihood of impact from an approaching vehicle, which in this example is from the driver's side.

The separation distance between the driver-side seat 134 and the passenger-seat 136 may be increased in a number of different ways—for example moving one or both of the seats farther away from the other. In the embodiment illustrated in FIG. 5, an initial separation distance is indicated by ($S_8$) and a final, increased separation distance is indicated by ($S_9$). In this embodiment, only the passenger-side seat 136 is moved. Specifically, it is moved toward the second side 130 of the vehicle 122 because the potential impact will occur on the first side 128. Although the seat 136 is moved toward a side 130 of the vehicle 122, it is moved rearward relative to itself. This movement helps to decrease the likelihood of any encroachment of the occupant or seat 136 into the space of the occupant of the seat 134 during the impact.

Although the separation distance between the seat 134, 136 could be increased further by moving the seat 134 toward the first side 128 of the vehicle 122, systems and methods described herein may inhibit such movement because it would be toward the direction of impact as indicated by the direction arrow 142. Although a seat may be moved toward the direction of impact in some situations— e.g., when the impact is from behind the vehicle and a rear seat is moved rearward—in other situations, movement of the seat toward the impact may be inhibited. In general, in the event of a likelihood of impact into a vehicle, embodiments of systems and methods described herein may increase a separation distance between two adjacent—i.e., front-to-back or side-by-side—seats that are in-line with the direction of impact by moving one or both away from the other, but inhibiting movement of a seat toward the impact under certain conditions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for positioning one or more seat arrangements in a vehicle having a front seat arrangement and a rear seat arrangement, the method comprising:
    increasing a separation distance between the front seat arrangement and the rear seat arrangement when the rear seat arrangement is occupied and at least one criterion indicates a likelihood of an impact into the vehicle from behind the vehicle, and
    wherein increasing the separation distance includes moving the rear seat arrangement rearward relative to the vehicle.

2. The method of claim 1, wherein increasing the separation distance further includes moving the front seat arrangement forward relative to the vehicle.

3. The method of claim 2, wherein moving the front seat arrangement forward includes moving the front seat arrangement forward by a predetermined amount based at least in part on at least one of a physique of an occupant of the front seat arrangement or a current position of the front seat arrangement.

4. The method of claim 1, further comprising automatically tightening a seat belt of the rear seat arrangement when the rear seat arrangement is moved rearward to increase the separation distance.

5. The method of claim 1, wherein the vehicle includes a first seat arrangement positioned on a first side of the vehicle and a second seat arrangement in the same row as the first seat arrangement and positioned on a second side of the vehicle opposite the first side of the vehicle, the method further comprising increasing a separation distance between the first seat arrangement and the second seat arrangement when both the first seat arrangement and the second seat arrangement are occupied and at least one criterion indicates a likelihood of an impact into the vehicle from the first side of the vehicle or the second side of the vehicle.

6. The method of claim 5, wherein the at least one criterion indicates a likelihood of impact into the vehicle from the first side of the vehicle, and increasing the separation distance between the first seat arrangement and the second seat arrangement includes moving the second seat arrangement toward the second side of the vehicle.

7. The method of claim 6, further comprising inhibiting movement of the first seat arrangement toward the first side of the vehicle when the at least one criterion indicates a likelihood of impact into the vehicle from the first side of the vehicle.

8. A method for positioning one or more seat arrangements in a vehicle having a front seat arrangement and a rear seat arrangement, the method comprising:
    moving the rear seat arrangement rearward relative to the vehicle when a plurality of criteria are met, including at least one criterion related to occupancy of the rear seat arrangement and at least one criterion related to a likelihood of impact into the vehicle from behind the vehicle; and
    not moving the rear seat arrangement rearward relative to the vehicle when at least one of the criteria is not met.

9. The method of claim 8, further comprising automatically tightening a seat belt of the rear seat arrangement when the criteria are met.

10. The method of claim 8, further comprising moving the front seat arrangement forward relative to the vehicle when the criteria are met.

11. The method of claim 10 wherein moving the front seat arrangement forward when the criteria are met includes moving the front seat arrangement forward by a predetermined amount based at least in part on at least one of a physique of an occupant of the front seat arrangement or a current position of the front seat arrangement.

12. The method of claim 8, wherein the vehicle includes a first seat arrangement positioned on a first side of the vehicle and a second seat arrangement in the same row as the first seat arrangement and positioned on a second side of the vehicle opposite the first side of the vehicle, the method further comprising increasing a separation distance between the first seat arrangement and the second seat arrangement based at least on an occupancy of the first and second seat arrangements and a likelihood of an impact into the vehicle from the first or second side of the vehicle.

13. The method of claim 12, wherein increasing the separation distance between the first seat arrangement and the second seat arrangement includes moving the second seat arrangement toward the second side of the vehicle when there is a likelihood of impact into the vehicle from the first side of the vehicle.

14. The method of claim 13, further comprising inhibiting movement of the first seat arrangement toward the first side of the vehicle when there is a likelihood of impact into the vehicle from the first side of the vehicle.

15. A system for positioning one or more seat arrangements in a vehicle having a front seat arrangement and a rear seat arrangement, the system comprising:
    a control system including at least one controller and configured to control a relative position of the front seat arrangement to the rear seat arrangement based on a plurality of inputs, including moving the rear seat arrangement rearward relative to the vehicle based on at least one input indicative of occupancy of the rear seat arrangement and at least one input indicative of a likelihood of an impact into the vehicle from behind the vehicle.

16. The system of claim 15, wherein the control system is further configured to control the relative position of the front seat arrangement to the rear seat arrangement by moving the front seat arrangement forward relative to the vehicle by a predetermined amount when the control system moves the rear seat arrangement rearward based on the inputs.

17. The system of claim 16, wherein the inputs further include at least one input related to a physique of an occupant of the front seat arrangement and at least one input related to a position of the front seat arrangement, and wherein the predetermined amount is based at least in part on the at least one input related to a physique of the occupant of the front seat arrangement and the at least one input related to the position of the front seat arrangement.

18. The system of claim 15, wherein the control system is further configured to automatically tighten a seat belt of the rear seat arrangement when the control system moves the rear seat arrangement rearward based on the inputs.

19. The system of claim 15, wherein the vehicle includes a first seat arrangement positioned on a first side of the vehicle and a second seat arrangement in the same row as the first seat arrangement and positioned on a second side of the vehicle opposite the first side of the vehicle, and wherein the control system is further configured to increase a separation distance between the first seat arrangement and the second seat arrangement when both the first seat arrangement and the second seat arrangement are occupied and at least one criterion indicates a likelihood of an impact into the vehicle from the first side of the vehicle or the second side of the vehicle.

20. The system of claim 19, wherein the at least one criterion indicates a likelihood of impact into the vehicle from the first side of the vehicle, and the control system is configured to move the second seat arrangement toward the second side of the vehicle and inhibit movement of the first seat arrangement toward the first side of the vehicle.

\* \* \* \* \*